Sept. 12, 1933.  A. H. STEWART  1,926,823
APPARATUS FOR FEEDING GLASS
Filed Nov. 23, 1932  2 Sheets-Sheet 1

INVENTOR
Andrew H. Stewart,
By Archworth Martin,
Attorney.

Sept. 12, 1933.  A. H. STEWART  1,926,823
APPARATUS FOR FEEDING GLASS
Filed Nov. 23, 1932  2 Sheets-Sheet 2
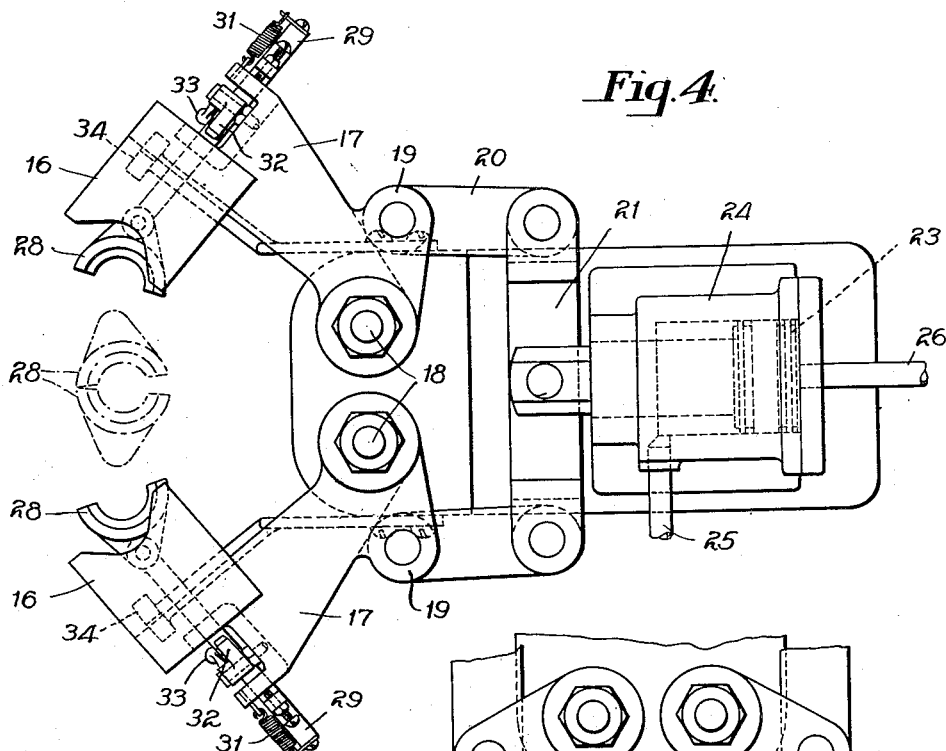
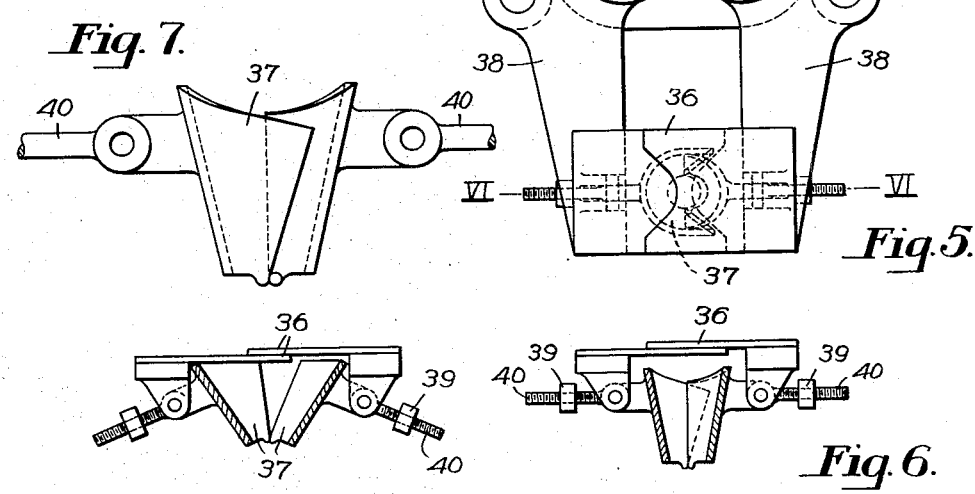

Patented Sept. 12, 1933

1,926,823

UNITED STATES PATENT OFFICE 1,926,823

APPARATUS FOR FEEDING GLASS

Andrew H. Stewart, Shields, Pa.

Application November 23, 1932
Serial No. 644,059

10 Claims. (Cl. 49—55)

My invention relates to a method of and apparatus for feeding charges of molten glass to molds.

One object of my invention is to provide an improved means for severing a stream of molten glass into mold charges and for shaping said charges.

Another object of my invention is to provide an improved arrangement of charge-forming cups and shears operating in conjunction therewith.

Still another object of my invention is to provide an improved manner of effecting a desired sequence of operation as between the shears and shaping cups or guide rings.

Figure 1:
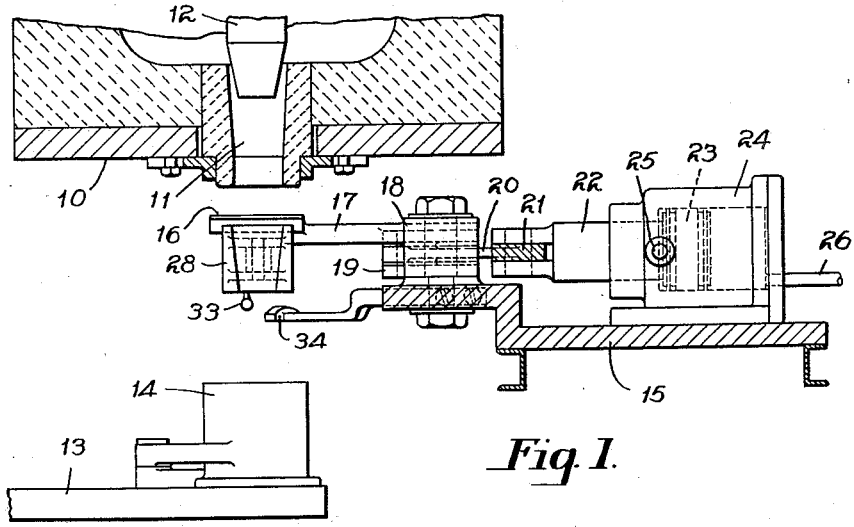
Figure 2:
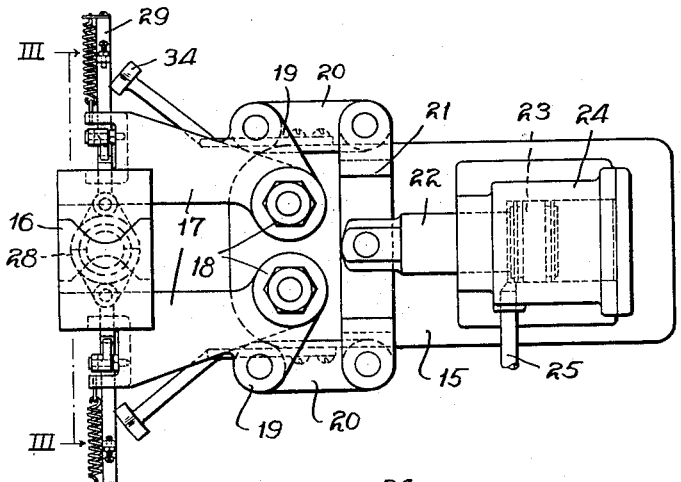
Figure 3:
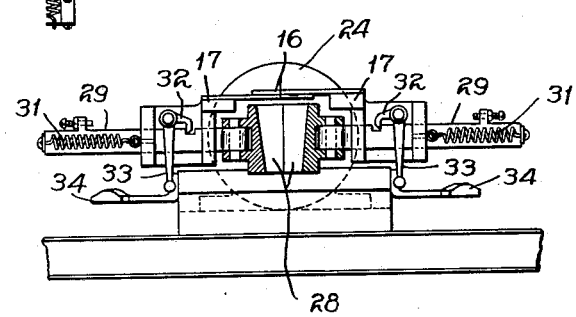

Some of the forms which my invention may take are shown in the accompanying drawings wherein Figure 1 is a side elevational view of shearing apparatus, together with the cup members, in operative position between a furnace boot and a mold table; Fig. 2 is a plan view of the shearing mechanism of Fig. 1; Fig. 3 is a view taken on the line III—III of Fig. 2; Fig. 4 is an enlarged plan view showing the parts of Fig. 2, in open position; Fig. 5 is a plan view similar to Fig. 2, but showing another form of apparatus for shearing and shaping mold charges; Fig. 6 is a view taken on the line VI—VI of Fig. 5; Fig. 7 is an enlarged view of the cup members of Figs. 5, and Fig. 8 shows the cup members of Fig. 6 in partially open position.

Referring first to the apparatus shown in Figs. 1 to 4, 10 indicates the forehearth or boot of a glass-melting furnace having a flow ring or orifice 11 through which flow of molten glass is controlled by a needle valve or plunger 12, or pneumatically by pressures applied to glass surfaces above the orifice. The plunger may be periodically reciprocated in timed relation to movement of a mold table 13, the molds 14 beneath the orifice, or may be normally held in raised position to permit constant flow of glass through the orifice, depending upon the viscosity of the glass, and the rate at which it is desired to feed charges to the molds. Thus for stiff glass, the plunger may be maintained in raised position during glass-feeding operations, while for hotter and less viscous glass, it may be periodically raised and lowered. It will be understood that the table 13 is advanced periodically to bring the molds 14 successively beneath the orifice, as is common in the art.

It will, of course, be understood that the flow of molten glass from the forehearth or boot may be either intermittent or continuous. Also, the flow can be controlled by alternate application of fluid pressure and suction to the surface of the glass within the boot in a manner well-known in the art.

The apparatus for operating the shears and the shaping members is mounted upon a base 15 that may be adjusted vertically by suitable mechanism to position the shears and the charge-shaping members at desired distances below the flow ring 11.

Shear blades 16 are carried by brackets 17 that are pivotally connected at 18 to the base 15, and have crank-like extensions 19. Links 20 are pivotally connected to the crank arms 19, and to the ends of a cross head 21. The cross head 21 is connected to a piston rod 22 whose piston 23 operates within a cylinder 24. Pressure is admitted alternately to opposite sides of the piston 23, through pipes 25 and 26, to effect reciprocation of the rod 22.

It will be understood that as the piston 23 is reciprocated, the bracket arms 17 will be oscillated about their pivots 18 to open and close the shears 16. The cup members 28 are mounted on the inner ends of bars 29 which are slidably supported in the brackets 17. Tension springs 31 have their outer ends anchored to the outer ends of the bars 29, and their inner ends anchored to the brackets 17, and serve to yieldably maintain the cups projected toward one another, beyond the adjacent edges of the shear blades, as shown in Fig. 4. When the brackets 17 are swung together, the cup members 28 will first engage, as shown by dotted lines in Fig. 4, the cups being pivotally mounted on the slide bars 29, so that their meeting edges can readily adjust themselves to one another.

When the piston is operated to bring the cup members 28 and the shear blades 16 together, the cup members will first engage one another, and continued movement of the brackets 17 toward one another, will cause the springs 31 to be tensioned since the shear blades are brought into cooperative relation without further movement of the cup members toward one another. At the limit of inward movement by the bracket arm 17, pivoted latches 32 which are carried thereby, will enter notches in the cup arms 29, to lock said arms in their outwardly-projected positions.

Therefore, when the bracket arms 17 are swung toward their open positions, the shear blades 16 and the cup members 28 will move apart simultaneously. If the blades were moved apart before the cups are opened, there would be danger of flowing glass passing between the shear blades and falling on the charge already in the cup, before said charge is released by the members.

When the cup members 28 have moved apart far enough to fully release the glass charge, the depending arms 33 of the latches 32 will engage cam members 34 that will trip the latches, and permit the springs 31 to move the cup arms 29 to their innermost positions. With the latch trip and the bars 29 in their outermost positions, the latch will ride upon unnotched portions of the bars 29, in a tilted position, so that the latch extensions 33 will not be interfered with by the cams 34 during closing movement of the brackets.

From the foregoing, it will be seen that not only do I provide a single operating means for the shaping or cup members 28 and the shears 16, but that the said members have a given relative movement during closing and shearing movements of the cup members and the shears, respectively, and a different relative movement during opening movements thereof. It is, of course, desirable, and perhaps necessary, to have the cup members reach their closed position and support the charge before the shears operate to sever a charge from the flowing stream of glass, and to have the cup members open at or before the shear elements separate.

The cup members, as shown, are open at their bottoms, and therefore serve largely as a guide ring and retarding member, to delay falling movement of the glass, and effect thickening thereof, to thereby reduce danger of "lapping" of the glass in the mold, such as would result from permitting an attenuated stream to enter the mold. If the bottoms of the cup members 28 are closed, there can, of course, be a more positive shaping of the mold charge. In working with very thin glass, it may be found necessary to provide bottom walls in the cup members, so that the cup will be completely closed at its bottom, while for stiffer glass, the bottom of the cup can be open somewhat, as shown in Fig. 3.

Referring now to Figs. 5 to 8, I show shear blades 36 that may be operated in substantially the same manner as are the shear blades 16. Cup members 37 are pivotally connected to the bracket arms 38 which carry the shear blades, and are normally held in the positions shown in Fig. 8, by adjustable weights 39 which have threaded connection with rod-like extensions 40 of the cup.

As the bracket arms 38 approach one another to bring the shears 36 into cooperative relation, the lower ends of the cup members 37 will come into abutting engagement, as shown in Fig. 8, and as the shear blades move across one another, the cups will be swung to their closed position, as shown in Figs. 6 and 7, with the knife-like edges thereof overlapping. The said edges are inclined and sharpened so as to prevent molten glass being caught between said edges, while the cup members are being closed.

In this form of apparatus, as in the case of Figs. 1 to 4, the cup members may be either partially or completely closed at their bottoms.

I claim as my invention:—

1. The combination with means for supplying a flow of molten glass, of charge-forming members comprising shear blades, divided cup members below the shear blades, bracket arms each carrying one of said blades and one of the cup members, means for moving said arms toward and from one another, and means for normally yieldably maintaining the cup members closer to one another than are the blades.

2. The combination with means for supplying a flow of molten glass, of charge-forming members comprising shear blades, divided cup members below the shear blades, bracket arms carrying said blades and cup members, means for moving said arms toward and from one another, means for normally yieldably maintaining the cup members closer to one another than are the blades, and means for effecting simultaneous separation of the blades and the cup members, respectively.

3. The combination with means for supplying a flow of molten glass, of charge-forming members comprising shear blades, divided cup members below the shear blades, bracket arms carrying said blades and cup members, means for moving said arms toward and from one another, means for normally yieldably maintaining the cup members closer to one another than are the blades, means for effecting simultaneous separation of the blades and the cup members, respectively, and means for restoring the normal positions of the cup members relative to the blades after said separation.

4. The combination with means for supplying a flow of molten glass, of charge-forming members comprising a pair of shear blades and a pair of cup members, a bracket arm carrying one blade and one cup member, a second bracket arm carrying the other blade and another cup member, means for moving said bracket arms toward one another, means for normally maintaining the cup members in advanced position relative to their shear blades, whereby the cup members are brought into cooperative relation in advance of the shearing operation, means for maintaining each cup member in fixed position relative to its associated blade at the beginning of opening movement of the arms, and means for thereafter restoring said cup members to their advanced positions.

5. The combination with means for supplying a flow of molten glass, of charge-forming members comprising a pair of shear blades and a pair of cup members, a bracket arm carrying one blade and one cup member, a second bracket arm carrying the other blade and another cup member, means for moving said bracket arms toward one another, means for yieldably maintaining the cup members in advanced position relative to their shear blades, whereby the cup members are brought into cooperative relation in advance of the shearing operation, means for latching the cup members against movement relative to the shear blades when they are in closed position, and means for releasing the latching devices after the said bracket arms have been moved toward their open positions.

6. The combination with means for supplying a flow of molten glass, of charge-forming members comprising a pair of arms each carrying a shear blade and movable relative to the other to close the shear blades, cup members removably supported on the arms and normally positioned to engage one another in advance of cooperative engagement of the shear blades, during shear closing movement of the arms, and means for yieldably holding the cup members projected toward their cooperative positions.

7. The combination with means for supplying a flow of molten glass, of charge-forming members comprising a pair of arms each carrying a shear blade and movable relative to the other to close the shear blades, cup members removably supported on the arms and normally positioned to engage one another in advance of cooperative engagement of the shear blades, during shear closing movement of the arms, the arms being movable to complete closing of the shears after the cup members engage one another, means for releasably locking each cup member relative to the shear blade at the completion of a shearing operation, and means for restoring the cup members to their normal positions through shear opening movement of the arms.

8. The combination with means for supplying a flow of molten glass, of a charge-forming device comprising a pair of arms each carrying a shear blade and movable toward one another to close the shears, a cup member slidably supported on each of said arms, and means for yieldably holding said cup members in position to cooperatively engage one another in advance of cooperative engagement of the shear blades during shear closing movement of the arms.

9. The combination with means for supplying a flow of molten glass, of a charge-forming device comprising a pair of arms each carrying a shear blade and movable toward one another to close the shears, a cup member slidably supported on each of said arms, means for yieldably holding said cup members in position to cooperatively engage one another in advance of cooperative engagement of the shear blades during shear closing movement of the arms, means for locking each cup member against movement relative to its arm, at the completion of shear-closing movement, and means for releasing the locking means upon movement of said arms toward shear-opening position.

10. The combination with means for supplying a flow of molten glass, of a charge-forming device comprising a pair of arms each carrying a shear blade, and movable toward one another to close the shears, a cup member pivotally mounted on each arm in such position that the cup members will engage one another in advance of cooperative engagement with the shear blades, the cup members being tiltable on their axes to permit closing of the blades.

ANDREW H. STEWART.